B. F. FIELD.
Grain-Drill.
No. 50,201.
Patented Sept. 26, 1865.
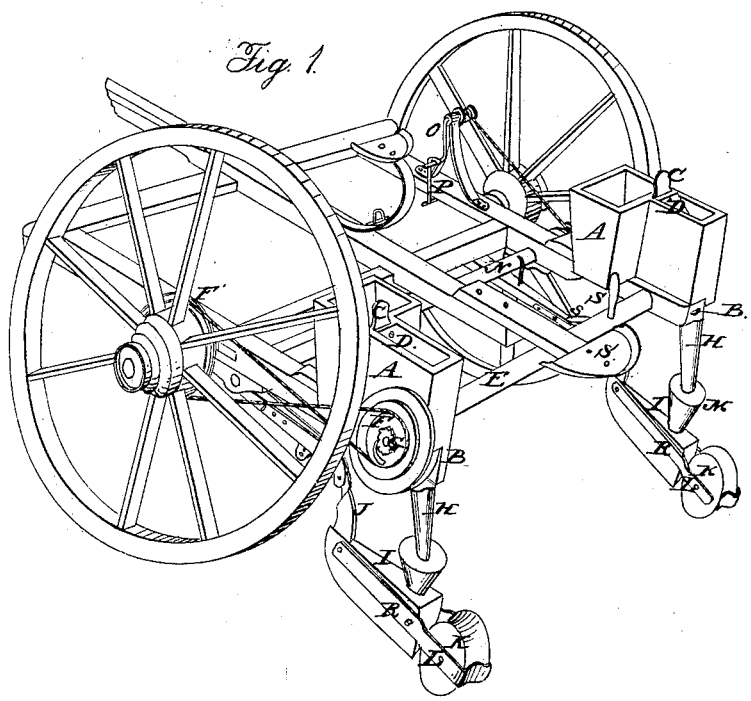
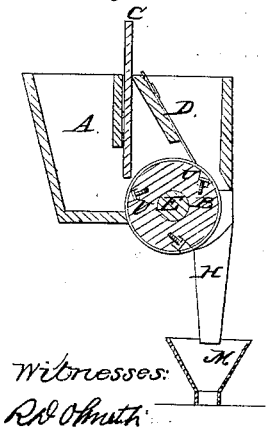
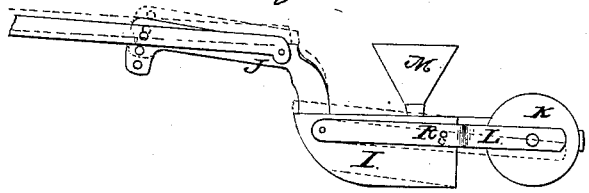
Witnesses:
R. D. O. Smith
Edw. T. Brown
Inventor:
B. F. Field

United States Patent Office.

B. F. FIELD, OF SHEBOYGAN FALLS, WISCONSIN, ASSIGNOR TO HIMSELF AND E. T. BOND, OF SAME PLACE.

IMPROVEMENT IN SEEDING-MACHINES.

Specification forming part of Letters Patent No. 50,201, dated September 26, 1865.

*To all whom it may concern:*

Be it known that I, B. F. FIELD, of Sheboygan Falls, county of Sheboygan, and State of Wisconsin, have invented certain Improvements in Machines for Planting Corn, Beans, Cotton, and other like Seeds; and I do hereby declare the following to be a full, clear, and exact description thereof, reference being had to the accompanying drawings, in which—

Figure 1 is a perspective view of my machine. Fig. 2 is a vertical section of the seed-hopper and dropping mechanism. Fig. 3 is a side elevation of my runner for opening the furrow, and roller for closing the same after the seed has been dropped, showing their attachments and adjustments.

The nature of my invention consists, first, in a novel manner of feeding and regulating the flow of the seed; and, secondly, in a novel manner of constructing and arranging the furrow-opener, whereby it may be readily adjusted to cut lightly or deeply, and also to cover lightly or heavily, as may be desired.

That others may understand the construction and operation of my machine, I will more particularly describe it.

The frame, wheels, &c., of my machine are constructed in any suitable manner. Upon each of the rear corners I mount the seed box or hopper A. Within the rear portion of this box is the feed wheel or roller B, provided with a suitable number of cells around its periphery, as is common.

The rollers B may be constructed in any of the ordinary ways, so that the capacity of the cells may be regulated in accordance with the kind or quantity of grain to be planted. Just in front of the seed-roller B is the gate C, which has a vertical movement in suitable gains cut in the sides of the seed-hopper. Back of the gate C is an inclined partition, to which is attached a spring, D, the lower end of which rests upon the upper surface of the roller B at a point in rear of the axis of said roller.

The rollers B in the seed-hoppers are both connected and revolved by a single shaft, E, lying across the rear of the machine, to which motion is imparted by one of the main bearing-wheels of the machine through the medium of a belt and pulleys F F'. The pulley F is not rigidly attached to the shaft E, but is loose thereon, and is caused to revolve when the machine moves forward by the ratchet and pawl G and G', which allows the pulley G to revolve without affecting the shaft, when the machine moves backward. As the seed-rollers revolve the seed is taken up according to the capacity of the cells, and, being carried over, falls out of the cells into the tubes H H, and is thereby conducted to furrow-opener I below. This latter consists of a divided runner constructed in any suitable way. It is, as common, sharp in front to divide the earth, and the divided end flaring behind for the purpose of opening a furrow into which the seed may fall. To its upper side and front end is attached the bent arm J, by which the runner is attached to the drag-bar of the machine; and to the rear of the runner is the concave-edged roller K, hung in the stirrup L, so that it may be adjusted to press lightly or heavily upon the ground, and therefore cover the seed lightly or heavily. The funnels M receive the grain from the tubes F, and conduct it through the runners to the furrows.

In going to and from the field it is desirable that the runners should be raised from the ground in order to avoid the danger of being broken by obstructions in the road. This is accomplished in the usual way by means of the windlass N, which is revolved by the crank and cords or chains O o, and held in any position by the stop P. This stop is a rod with a bent or hooked end, as shown. The other or lower end is secured to a spring-bar beneath the floor of the machine, and is carried out of its place and away from the crank by placing the foot upon the pin *p*, which presses the said spring-bar down, and carries the stop P down with it.

The rear end of the drag-bar is slit, so as to receive the end of the arm J; or the arm may be double and receive the end of the drag-bar between the two parts. I, however, prefer the former plan. In this way, it will be perceived, I secure space for two pins or bolts of attachment, and by making the forward end of the arm J with a downward crook or elbow, or with a T-shaped head, I can have several holes through which to put said bolts or pins, and can thereby secure a ready means of adjustment, as will be evident by the red lines in Fig 3. This adjustment is necessary in order to make the heel of the furrow-opener cut into the ground as deep as may sometimes be required; or the adjustment may be regulated so as to depress the point or cutting-edge, and cause that to cut into the ground to divide the furrow deeply. After the seed is dropped the roller K replaces the loose earth and presses it closely upon the buried seed, and the amount of pressure so applied may be regulated by removing the pin R and replacing it in a higher or lower hole, as it may be desired to diminish or increase the pressure.

The operation of the furrow opening and covering devices is apparent. Their only peculiarity consists in the adjustments spoken of, the advantages of which will be apparent, and need no further setting forth.

The operation of the seed-hopper and feeding device is as follows: The seed is placed in the hopper and in direct contact with the feed-roller B. If the machine was always to be used on level ground there would not be any necessity for adjustable devices to regulate the flow of the seed, as a permanent partition sufficient to prevent a flow of seed over the roller would then be sufficient; but level fields are not plentiful, and it is desirable at all times to allow as much seed to be in contact with the wheel B as possible. If, then, the ground is moderately uneven the slide C is so placed that in going up hill the seed will not be permitted to flow over the top of the wheel B.

It is not contemplated to change the elevation of the slide every time the machine encounters an elevation or depression on the surface of the field, but only to set it once for the field or a certain part thereof. It sometimes happens, however, that the field to be planted is so uneven that the slide C will not operate satisfactorily without constant attention. In such cases the spring D is added, which, pressing upon the feed-wheel in the manner shown and heretofore described, will evidently prevent any overflow of seed, while if a kernel chances to be so caught that it must pass out or be crushed the spring will yield sufficiently to let it pass unharmed. The foregoing description supposes the grain to be planted in drills, and the operation of the machine entirely automatic. It is, however, sometimes desirable to plant in hills which are check-rowed, and to do this it is necessary that the dropping mechanism should be operated by hand, as an automatic dropper cannot be made to operate with the requisite irregularity. I therefore, when desiring to plant by check-rows, remove the belt which communicates motion from the main wheel to the pulley F, and cause the shaft E to be revolved by the hand of a person sitting upon the seat S. This he does by grasping the handles s and turning the shaft at the proper moment.

It may be said that the distance through which the corn must drop after being released from the seed-cell will render the dropping liable to be irregular; but this objection will be evidently groundless when it is suggested that it is no more difficult to drop the corn two or three seconds before reaching the proper hill or check-row, than to drop it at the instant of passing said row. In either case the operator is guided by his eye, assisted by some marking device which can be set to indicate a short distance before the row sufficient to correspond with the forward motion of the machine and period of time occupied by the falling grain.

The peculiar form of the seed-cells should have been referred to before, but was overlooked. It consists in excavating them diagonally, as shown at U, Fig. 2. This renders them deeper on what is the front edge when the cell is above the axis of the feed-wheel than on the rear. The effect of this form is, the cell fills more readily with seed, and when the proper moment arrives it is discharged in a body, and not straggingly, a kernel at a time, as would be the case if the cell were of equal depth on all sides.

It will also be observed that by shifting the drag-bars nearer to or farther from each other the width of the rows may be varied at pleasure. If it is desirable that the rows should be so near together that the seed boxes or hoppers in their present position will not feed the seed into the funnels of the runners, the seed-rollers may be shifted to the inner sides of the side pieces of the frame and the seed-boxes transposed, the left-hand one put on the right-hand side of the machine, and a difference of some ten or twelve inches will be made, which, added to the variation which may be obtained by setting the tubes H in an oblique position, will amount to as much latitude as will ever be required.

Having described my machine and its operation, what I claim as new, and desire to secure by Letters Patent, is—

1. Adjusting the runners I so as to press upon the heel or point, as desired, substantially in the manner shown and described.

2. The stirrup L, for the purpose of attaching and adjusting the covering-roller K, substantially as set forth.

3. In combination with the seed-roller B, the slide C, for the purpose of preventing an overflow of seed, substantially as set forth.

4. In combination with the seed-roller B, the spring D, for the purpose of preventing an overflow of seed, substantially as set forth.

5. The oblique seed-cells U U, substantially as and for the purpose set forth.

B. F. FIELD.

Witnesses:
R. D. O. SMITH,
AUGS. JORDAN.